Figure 1:
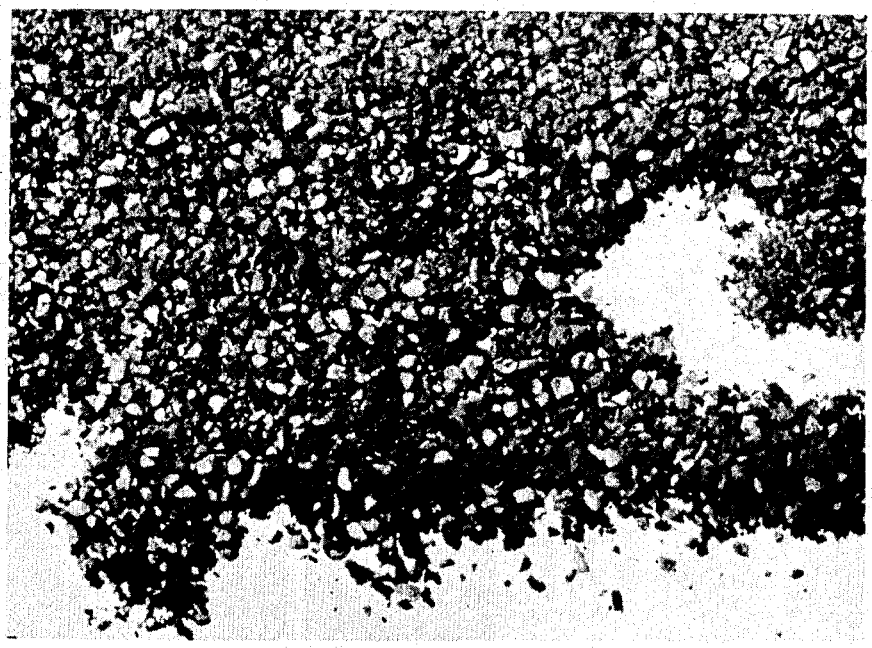

United States Patent [19]
Reeves et al.

[11] 3,821,430
[45] June 28, 1974

[54] COFFEE PRODUCT AND PROCESS

[75] Inventors: Robert C. Reeves, Wyckoff; Michael Mansky, Upper Montclair; Napoleon Stavropoulos, Fort Lee; William W. Kaleda, Washington Twp., all of N.J.; Willie J. Richards, Garnerville, N.Y.

[73] Assignee: General Foods Corporation, White Plains, N.Y.

[22] Filed: Aug. 14, 1972

[21] Appl. No.: 280,619

[52] U.S. Cl. ............... 426/147, 426/193, 426/285, 426/453
[51] Int. Cl. ............................................ A23f 1/08
[58] Field of Search .......... 99/65, 71, 152; 426/147, 426/193, 285, 453

[56] References Cited
UNITED STATES PATENTS

| | | | |
|---|---|---|---|
| 3,443,961 | 5/1969 | Kaleda et al. | 99/71 |
| 3,482,990 | 12/1969 | Pfluger et al. | 99/71 |
| 3,493,389 | 2/1970 | Hair et al. | 99/71 |
| 3,554,760 | 1/1971 | Sienkiewicz et al. | 90/DIG. 4 |
| 3,656,964 | 4/1972 | Mansky et al. | 99/71 |

FOREIGN PATENTS OR APPLICATIONS

| | | | |
|---|---|---|---|
| 1,552,967 | 12/1968 | France | 99/71 |
| 1,056,693 | 1/1967 | Great Britain | 99/71 |

OTHER PUBLICATIONS
Perry, Chemical Engineers' Handbook, 4th Ed. 1963, pp. 21-36, & 21-37.

*Primary Examiner*—Frank W. Lutter
*Assistant Examiner*—William L. Mentlik
*Attorney, Agent, or Firm*—Bruno P. Sturzzi; Michael J. Quillinan; Daniel J. Donovan

[57] ABSTRACT

This invention concerns production of instant coffee blends composed of two dissimilarly surfaced dried coarse granular extracts having diverse flavors and appearances, the first being a quality freeze dried component and the second being preferably a lower quality lightly roasted Robusta containing irregularly surfaced agglomerate derived by spray drying and fusion agglomeration to a low density which is approximated by that of the freeze dried extract.

30 Claims, 3 Drawing Figures

COFFEE PRODUCT AND PROCESS

BACKGROUND OF THE INVENTION

In the production of soluble coffee products having distinctive appearances and flavors, published art has disclosed procedures for producing a freeze dried product which may be blended with a spray dried product; cf U.S. Pat. No. 3,244,533 to Clinton, et al; U.S. Pat. No. 3,493,389 to Hair, et al; and French U.S. Pat. No. 1,552,967 to Hair, et al, published Dec. 2, 1968. The concept of combining a product with rich aroma quality so endowed by reason of aromatization and drying by freeze drying permits blending of a quality extract with a more economical one percolated from blends high in less desirably flavorful but inexpensive Robusta beans; however, flavorfully combining these two dissimilar extracts in a packaged granular blend having an attractive roasted and ground coffee-like appearance presents problems.

Whereas immediately after blending the spray dried particles they cling to the freeze dried granular components, upon standing a few days the particles detach and separate. Oil plating mitigates against this tendency but not sufficiently to permit national distribution of a commercial product. Adjustment of particle size by agglomerating the spray dried particle does not rectify this problem; a high Robusta content seems to reduce agglomerate strength; the agglomerate tends to break in packaging and shipment as part of the blend; segregation recurs. Prior to this invention conventional agglomerating technology left much to be desired in providing an agglomerate having the strength to withstand abrasion and segregation that stemmed therefrom as a result of blending with freeze dried granules.

STATEMENT OF THE INVENTION

The present invention is founded on the discovery that quality arabica coffee extracts, including but not necessarily restricted to those endowed with flavorful aromatic constituents such as steam volatilized aromas, grinder gas and like aromas known in the art, can develop such quality as permits dilution by blending with lower quality, separately dried extracts provided the quality granular extract is freeze dried separately to a density between 0.18 and 0.35 grams per cc and the lower cost extract is percolated to a high yield preferably after light roasting, to produce a percolate which is spray dried, coarsely pulverized and fusion agglomerated to a light density, the density of one dry-extract approximating within 25% that of the other. In this context and the balance of the specification, the term density pertains to free flow density of the total charge of each of the blended components. It is recognized that in the course of blending per se and the ancillary steps of storage preparatory to blending and packaging attrition milling of the agglomerates may generate a higher percentage of fines. In its broadest context the density of one dry extract preparatory to all steps incident to the manufacture of a packaged blend may call for blending an agglomerate whose free flow density per se prior to blending is greater than 25 percent different than that of the granule and which may range upwardly to as high as 50 percent. But as a result of blending and said ancillary steps up to and including packaging the agglomerate density will be increased, in which case the density will be changed from above 25 percent to within 25 percent of the coarse component density.

Depending upon the degree of quality of the freeze dried extract, organoleptic sensitivity to it is such that expert and consumer taste panels cannot detect cup flavor differences when significant levels of fusion agglomerated extract are uniformly blended. It has been determined that this can be achieved if the blend for lower quality extract is lightly roasted, as measured by color number procedures described hereinafter.

Emphasis upon control of agglomerate and granular density should be coupled with selectivity in particle size and distribution, the most preferred non-segregating blend being one wherein the particle size distributions are substantially comparable. In some applications the fines or pan fraction passing a 40 mesh screen in both the granule and the agglomerate components will be reduced by overt screening and separation followed by reintroduction into the upstream processing areas for reworking; this practice will be preferred if only to reduce any excessive amounts of fines which can be generated during the course of blending. Thus, in the case of the agglomerate particularly, which is prone to abrasion or attrition milling through the simple act of blending, the most preferred practices will involve recycling a portion of the pan fraction to the charge to the fusion agglomeration zone.

However, it is a feature of this invention that by reason of the strength of the fused agglomerate per se, the amount of fines generated in the course of blending as well as subsequent packaging and shipment will be comparatively minimal, though some will exist or be generated. Indeed, by virtue of the density reduction that may be practiced for both the fused agglomerate as well as the granule and the collateral reduction in segregation thereof as these particles are matched in their density, the amount of fines that may be tolerated in the blend is increased correspondingly, since the aesthetics of two dissimilar granular forms of soluble coffee are such that the components as blended represent the major consumer impression and since the components are relatively stable per se as blended against segregation, settling or other redistribution of accompanying fines in the blend will be less noticeable and so a relatively higher percent of fines may be included in the granular fraction or tolerable as a result of incomplete agglomeration or breakdown of the agglomerate fraction during blending.

As will be explained hereinafter, it will be preferred to recover and recycle in dried extracts of lightly roasted blends, particularly such as lightly roasted Robusta blends, a significant amount of recycled small agglomerates and unagglomerated fine coffee particles.

A preferred embodiment of the present invention is a non-segregating blend of a freeze dried granular form of quality extract with one of different quality wherein the latter contains extracts of blends of a substantial (above 30 percent) though not necessarily major weight percent of poorer quality Robustas; the art for achieving this latter product generally involves roasting the lower quality coffee blend to a light roast color number and extended extraction thereof under high pressure percolating conditions to a green yield above 35 percent soluble solids; such extracts after drying and agglomeration as discussed herein are bland and compatibly blendable.

Consumers are attracted by a coarse granular form of product and applicants have worked in this art to identify processes whereby granules and agglomerates each have a density and form requisite for preventing particle segregation. Generally, the density of the granules should be within 25 percent of the agglomerate density. The granule may range upwardly in particle size to that approximating particles of roasted and ground coffee beans or larger. Granules are preferably derived from blends high in quality arabica beans generally known as Milds, such as Colombian Medellins. These quality arabicas will usually constitute in excess of 30 percent of a flavorful blend and optimally the blend will be free of or low (say below 30 percent) in inferior quality Robusta beans.

To afford the consumer with a consistent flavor, the blend of instants should be uniformly distributed throughout and should be relatively stable against powdering and segregation in storage and shipment. The agglomerates of spray dried particles produced for this invention will be of such toughness, coarseness, shape and overall surface irregularity that when blended with the coarse granular component they tend to bridge or nest, yet still provide a free-flowing granular mixture. In national distribution such segregation as would be manifested by particles adhering to the sides and bottom of the glass is minimal. Uniform flavor is thus provided by such a product.

Although it may be visualized that adjustment of spray dried coffee particles above 300 microns to match size of the freeze dried granule might be effected by agglomeration, there are some imponderables as yet unexplainable. Agglomeration involves wetting to above 3 percent. It has been thought by some that water vapor transfer from such an agglomerate to the freeze dried granule would cause instability, particularly in one high in low molecular weight aromatics; blending a relatively moist agglomerate therewith would appear to contribute to caking and flavor instability of the freeze dried granule. Unexpectedly, this has not been found to be the case, even though granules at 1-3 percent moisture are hermetically packaged in accordance with the invention with agglomerates of 3.5-5.0 percent moisture and are so proportioned as to occasion water vapor adjustment to as high as 4.5 percent by transfer from the agglomerate, a more preferred total moisture level for the granule being below 4.0 percent and typically 3.5 percent. It appears that moisture pickup by the granule from the agglomerate is not sufficiently detrimental to granule quality and stability provided the blend is packaged hermetically under reduced oxygen levels effected by a nitrogen, carbon dioxide or other gas purge.

In one of its most practical embodiments the invention calls for recovering the bland percolate from a coffee blend of the aforesaid type high in less costly extracts, spray drying the percolate, pulverizing the spherical dried particles, and then agglomerating the dried particulate extract into a fused, low density, relatively moist coarse particle of such density that the agglomerate is matched by that of the freeze granular quality extract within a preferred range of 15 percent. It will be found that at the low densities practiced for blending the particle size will be a significant factor in assuring a control of any segregation tendency. Indeed, as the proportion of coarse granular freeze dried component decreases in relation to the total mass, the criticality of assuring uniform distribution without subsequent migration of particles requires that the agglomerate and the granule each have a major weight percent of the particles in the −12 +40 mesh fraction. To achieve this end, the agglomerate will preferably be screened to reduce the pan fraction and coarse agglomerate fraction, the screened fractions being recycled back to the steam fusion zone as described herein with a very minor percent of the agglomerate fraction to achieve strength or toughness for the granule. The practice of this invention does not foreclose the presence of distinctly coarse granules, since their presence in a very minor weight percent, say below 15 percent of the coarse granular component, will not significantly alter the segregation of the blend.

Alternatively, portions of a given percolate can be split off as recovered, the initial minor fraction, say the first third, being a flavorful, high quality extract of 25-35 percent solids separated from a lower quality, more dilute extract. The coffee blend may contain both quality arabicas, low quality Robustas, as well as intermediate quality coffee like Santos. In this embodiment, the later drawn off bland percolate at a lower solids concentration will be spray dried and fusion agglomerated as specified herein to the desired density target, the quality drawoff from the initial percolation cycle or cycles being freeze dried to a granular form of the stated moisture under the conditions described. In still another alternative, the quality extract can be "split extracted," i.e., percolated into two separate extracts from the same blend of roasted and ground coffee; usually this is effected with an atmospheric dilute extraction of relatively high quality extract and a separate drawoff from an autoclave section of a percolation train as just described and repercolated therefrom; thus the atmospheric dilute extract at preferably below 15 percent and above 5 percent solids will be freeze dried in granular form and the autoclaved percolate spray dried and fusion agglomerated.

In both alternatives, the quality drawoffs when dried will have a density of 0.20 to 0.30 grams per cc ideal for low density granule blending. The higher quality extract will be percolated in any event to a low green yield below 35 percent. The lower quality extract advantageously can be percolated to a green yield well above 10 percent for maximal solids recovery and dilution of Robusta notes.

The granular component will preferably be an aqueous extract of a quality arabica-Milds blend percolated to a green yield generally between 30-40 percent and usually less than 35 percent soluble solids; the extract will be freeze dried in coarse granular form from a statically forzen extract which may either be dilute, i.e., 15-30 percent, and of a predetermined concentration yielding a preferred light density less than 0.30 grams per cc in the solids, or concentrated as by freeze concentration or vacuum concentration to between 30-50 percent solids and foamed by a compatible gas such as carbon dioxide or nitrogen; foam may contain water ice crystals added thereto or incorporated therein prior to granulation and freeze drying; in this application also the desired granule will have a light density preferably between 0.20 and 0.30 grams per cc. The dried granule will initially have a mositure level between 1-3 percent before packaging and most preferably should have a density between 0.20 and 0.25. Agglomerates and granules thus produced will, when blended and substantially hermetically packaged, undergo vapor transfer from the agglomerate to the granule but will be relatively stable against particle segregation. In this connection, the term hermetic will be understood as used throughout this specification to refer to the practical ability to seal a jar or other package with a minimal change in oxygen and moisture content, although for practical considerations it will be understood that such contents will change but not significantly using seals now prevalent in the art; however, for the most aromatized extracts practiced in accordance with this invention it will be desirable to assure a virutally absolute oxygen reduction to below the stated preferred range hereinafter of less then 4 percent.

As indicated previously, stability considerations for the granules are not quite as moisture dependent as art workers have thought. It is believed that this is partially explained by the practice of subliming the quality extract under conditions which employ a condenser temperature at or below 40°F and heating platens which avoid product heating to above 130°F as the moisture content is reduced to below 3.0 percent and preferably to 2.5 percent, most preferably 2.0 percent, but not less than 1 percent.

In its broadest aspects the invention involves the blending of at least two components of dried coffee powder or extracts different in quality and type from one another, this difference being typically in bean variety and/or extract type in terms of level of aromatic arabicas (e.g., Milds versus Robustas); in particle type (e.g., freeze dried granules high in quality Milds-arabicas extract versus agglomerated bland Robusta extracts); or in chemical composition (e.g., different in alkaloid content such as caffeine) as will be described hereinafter.

The component containing the extract usually high in less costly Robustas will be spray dried under processing conditions which do not alter the flavor of the extract through undue caramelization in drying; the roasted Robusta beans may also be steamed before extraction as is known. The spray dried particles recovered will be at a moisture content of 2–3.5 percent. The particles will be agglomerated in an elevated temperature, humid, turbulent, confined agglomerating zone formed by saturated low-quality steam sprays or jets to a point where particles in a discrete curtain or sheet-like pattern reach a point of tackification at the particle surfaces and are redirected and contact one another. The agglomerate thus produced may be further fused by heating either in a falling gravity zone or on a belt, such techniques being referred to hereinafter as tower agglomeration or belt agglomeration, and the fused agglomerate having a moisture content between 3.5–5.0 percent, preferably above 4.0 percent, after the tackifying or particle melting phase of the agglomeration process has been effected. To prepare for agglomeration, the spray dried particles will be cooled to subambient temperatures of less than 80°F, subdivided to a coarse particle size distribution whereat the major weight percent of the particles is below 200 microns and above 15 microns. The particle charge will thereafter be introduced at this reduced temperature in a discretely dispersed pattern to the tackification or fusion zone where it is preferably contacted by nonsuperheated steam, which is thereby caused to condense water vapor controllably on the coarse particles; in this preferred fusion agglomeration practice, the agglomerate will be exposed to a high weight of steam relative to the particle charge, the weight ratio being 0.75:1 to 1.5:1.

The preferred steam fusion agglomerating practices employed in accordance with this invention are modifications of those set forth in U.S. Pat. Nos. 2,977,203; 3,554,760 to Sienkiewicz, et al; 3,485,637 to Adler, et al, 1969; and 3,615,670 to Sienkiewicz, et al, since, to achieve the light density agglomerate specifically required for this invention, the pulverized spheres should be relatively coarse. It has been found necessary to use a mill such as a Fitzpatrick impact mill or an Alpine pin mill which produces a size distribution wherein typically between 30–100 percent by weight will be finer than 150 microns and less than 15 percent by weight will be less than 15 microns. This promotes requisite point-to-point contact and resulting void spaces in an overall granular appearing agglomerate having a coarse, uneven, jagged surface which may receive some of the very fine pan-sized dust particles of the blend and localize them. Generally, the size of the agglomerate should match that of the granule, particularly in the fraction larger than the pan fraction. Preferably, the agglomerate should have a particle size distribution whereat a substantial majority (70 percent) by weight of the particles are retained on a 40 mesh screen and pass a 12 mesh screen, U.S. Standard Sieve. A matching particle size distribution will be one wherein the +12 +20 +40 fractions severally and in combination match one another in weight within 50 percent.

In a more preferred embodiment the fines or pan fraction, that is, particles passing a 40 mesh screen, will be significantly reduced to below 20 percent and ideally to below 15 percent in the total blend. To assure this result, the pan fraction of both the granule component and the agglomerate component will be collected and recycled either separately or in combination to the charge of particles feeding the agglomerating zone. Thus, it is within the ambit of this invention that freeze dried as well as spray dried agglomerated fine particles and fractions thereof can be added to the cooled charge of material feeding the agglomerator just prior to being contacted by the agglomerating fluid.

Whereas the preferred agglomerating process involves the steam fusion practices specified in the patents listed above since they assure maximizing agglomerate toughness when the pulverized spheres are of the specified coarse granulation, it should be understood that in its broader aspects other versions of a steam fusion agglomeration method can be practiced to like advantage. Thus, spray dried spheres can be agglomerated by the adhesion of a concentrated extract strategically distributed at the points of contact of the particles under conditions wherein the particles per se melt and are bonded to their surfaces through the intermediation of such overtly added agglomerating fluid as concentrated coffee extract. Such an agglomerate will in effect be composed of fused soluble coffee particles; such agglomerating techniques are maximized as in the case of the steam fusion agglomerating processes preferred by subdivision of the particles to a very discrete size finer than 150 microns. The particles will be aggregated by tumbling or other collision effected as in a fluidized bed and will be brought into contact to produce a jagged, irregularly surfaced, voids-containing particle within the density range specified. Since it is particularly critical for efficacious blending that the agglomerate remain fused or withstand the abrasive forces of blending with granules and the attrition experienced in packaging and shipment, an agglomerate strength or toughness which minimizes the pan fraction of −40 mesh should be observed. This agglomerate strength can be measured by subjecting the agglomerate after it has been screened to remove fines to a Rotap or other vibratory sifting for a standard period whence the pan fraction is again analyzed; a low weight percent of pan fraction after such agitation will be indicative of agglomerate strength. Hereinafter a test procedure for such agglomerate strength is set forth. In that context, the pan fraction should be increased as a result of standard vibrations no more than 20 percent by weight of the total agglomerate stream; thus, a given stream of agglomerates will be subjected to the specified vibration test and will not generate an increase in the pan fraction size agglomerates greater than 20 percent, and most preferably greater than 10 percent.

To achieve this agglomerate strength in the preferred steam fusion agglomeration practices set forth herein with reference to the Sienkiewicz, et al, patent aforesaid, and particularly the U.S. Pat. No. 3,554,760 patent, the plenum area above the charge of subdivided particles should be such that in cooperation with the steam fusion jets and the turbulence-inducing air there is a negative pressure in the order of 0.04 inch $H_2O$; this is effected by appropriate regulation of the hot inlet air to the plenum and the exhaust air from the steam fusion zone; ambient air in the neighborhood of 700 to 300 cfm is caused to enter the intended zone of turbulence to effect particle collection. As stated in the cited Sienkiewicz patent, the steam jets should contact powder at the point where a curtain thereof begins to spread, such spreading being induced by the steam jets and the negative pressure induced in the agglomerating zone; in this way requisite collisions and redirection of particles to achieve a low density fused agglomerate is obtained. Agglomerate toughness and strength has been found in practicing this invention where density reductions substantially below 0.30 grams per cc to as low as 0.20 grams per cc is desired to require a wetting as well as coarse subdivision to a median particle size above 25 microns. Wetting is particularly essential in high Robusta extracts and even more so in lightly roasted extracts high in Robusta; such extracts have an estimated melting point in the pulverized stream (at 2.0–3.5 percent moisture) at or above the steam temperature, i.e., between 215° and 240°F. Wetting lowers this melting point and thus assures toughness. Nevertheless it has been found in practicing this invention with extracts particularly high or exclusive in Robusta content to further toughen the agglomerate by recycling previously wetted and partially dried agglomerates as well as fines and coarse agglomerates.

The agglomerate can be blended efficaciously with the differently constituted quality extract granule at a substantial level in the total blend, say in the order of 30–95 percent thereof. The benefits of the invention will become more apparent as the proportion of granules to agglomerates is reduced within this range. The level of agglomerate will depend on the marketing need identified; in its most advantageous aspects the invention involves freeze drying a coarse granular, principally Milds-containing extract and blending it at a level of 5–60 percent of the total blend depending upon the extent of aromatization,, the Milds content of the percolated blend and/or the comparative level of lower quantity Robusta extract in the agglomerate content.

One embodiment of the invention is to roast two distinctly different blends of coffee separately, one blend being predominated in character by a Milds-type arabica, predominance being synonymous with flavorful presence at a weight level exceeding 30 percent and typically at or above 50 percent of the specific blend. The other blend, high if not exclusive in Robustas, will be roasted separately and usually lightly to a roast color number as defined hereinafter greater than 60, indicating a light roast; the higher the color, the lighter the roast by reason of the higher percent reflectance from the lighter color.

For marketing distinctiveness and attractiveness of the blend ultimately produced, the two coffee components optionally may be of substantially different colors or may be of approximately the same color. The fused agglomerate will be dark in color having a color number as expressed herein, usually less than 40. The coarse, chunky agglomerate may have a color substantially matching the color of the granule and so the granule may be recovered from slowly frozen or otherwise treated extracts by methods known in the art; a blend with this deep, rich color is suggestive of a roasted and ground quality coffee. Alternatively and preferably, the granular extract may be rapidly frozen for a light color.

The extent to which the quality component of the blend of extract powders is roasted has a bearing on consumer taste preference. An arabica-Milds blend may be darkly roasted, say to a color number less than 50 and percolated to a green yield of 30–40 percent solids, the extract recovered being comparatively heavy in aromatics.

The freeze dried component of the blend will most preferably have a density within 15 percent of that of the fusion agglomerated constituent, particularly in those fractions wherein density is within the range of 0.20 to 0.30 grams per cc. The particle size distribution of such a freeze dried component need not match that of the fused agglomerate portion, but for most preferred appearance and avoidance of segregation during marketing, the −12 +40 mesh fraction of each component should each be a major weight percent.

The quality component will usually be freeze dried to a stable moisture condition above 1 percent and below 3 percent, ideally in the neighborhood of 2 percent; it will be infused with an inert stabilizing gas such as nitrogen prior to withdrawal of the granular material from the freeze drying chamber upon completion of the freeze drying operation. Freeze drying should be practiced at absolute pressures below 500 microns at usually below 200 microns during the terminal stages of drying, and should employ a condenser temperature (measured at ice layer) below −40°F. The gas-infused freeze dried granule should be stored in air-purged bins and should be blended within a comparatively short period of less than a week in oxygen-reduced tote chambers.

Freeze drying practices to achieve freeze dried granule manufacture in accordance with the invention are set forth in U.S. Pat. Nos. 3,244,533 and 3,438,784 to Clinton, et al; 3,365,806 to Pfluger, et al; and British Pat. Nos. 1,102,587 and 1,102,588 to Nestle Products, Limited, published Feb. 7, 1968.

The agglomerated component should be processed under conditions which minimize caramelization and associated off flavors stemming from elevated product temperatures in drying and agglomeration. To this end, the spray dried particle per se should not be reduced to a moisture level below 2 percent.

It has been found that spray dried extract fragments high in lightly roasted coffee, e.g., Robusta, are particularly difficult to agglomerate to a low density, i.e., below 0.28 grams per cc, while having the inherent toughness of other agglomerates; to assure agglomerate strength for blending with granules, such particles will preferably be cooled to below 60°F prior to fusion agglomeration.

In the agglomerating medium, the fragments will undergo an increase in moisture content at the surface thereof to a point such that the agglomerate per se will be moistened to the required 3.5-5 percent range. Under such conditions the particles will be heated above 100°F and will surface-melt to be sufficiently thermoplastic for fusion.

Fusion will be exemplarily effected in apparatus of the type shown and described in U.S. Pat. No. 3,554,760 to Sienkiewicz, et al, wherein a dual set of saturated steam agglomerating nozzles effect requisite wetting and fusion. Since other agglomerating fluids than saturated steam are practicable adjuncts, an atomizing spray of hot water of hot coffee extract at a minor weight percent of the fusion medium may be employed; in such instances, it will be less needed to dry the spray dried particle to the lower limits of the stated range.

Some agglomerates have a comparatively wide particle size distribution and may occasion substantial (20-40 percent) amounts of recycling to the agglomerating zone for mixing with newly introduced ground particles, particularly in density reduction to below 0.30 grams per cc. To reduce the amount recycled, the spheres should be subdivided as in a pin mill so that a major weight percent thereof is below 100 microns in particle size. Preferably, the spray dried spheres at a moisture content of 2-3 percent will be cooled by liquid gas prior to pulverization to a temperature below 60°F, and ideally between 30°-50°F; the lower the temperature to which the particles are cooled, the less the amount of fusing medium with or without hot water or extract will be required. For packaging stability reasons, the agglomerate per se should have a moisture content below 5 percent and preferably below 4.5 percent, depending upon the amount thereof employed; as the level of granule employed in the blend is increased, a higher terminal moisture agglomerate target may be tolerated, but not above 5 percent in any event.

In some agglomerating practices, particularly those wherein the agglomerate is moistened to above 5 percent moisture to maximize toughness, it will be practical to employ an after-dryer to reduce the moisture content of the agglomerate to below 5 percent. Thus, in a tower agglomerator the latter stages of agglomeration are such as to effect a requisite drying to below 5 percent moisture in instances where the agglomerate may be wetted to as high as 6 percent moisture; on the other hand, after initial fusion agglomeration it may be practical to belt dry the agglomerate from above 5 percent moisture down to the stated range of 3.5-5 by fluidized bed drying or static bed drying.

The most preferred embodiment for agglomeration will involve causing the fusion process to proceed in a free-fall gravitational vertical drying tower having outlet air at below 250°F (dry bulb) with relative humidity of 15-30 percent and wherein the inlet drying air, say at a temperature above 400°F (dry bulb) and ranging to 500°F, will be blown downwardly and contact the agglomerate; the fused agglomerate will be eventually cooled to below 80°F after collection for setting the fused conditions.

It has been observed that electrostatic forces are generated during blending of freeze dried and agglomerated coffee products and remain afterwards for several hours. This helps to retain blend stability. It appears, therefore, that advantage should be taken of the phenomenon by packaging the blend of freeze dried and agglomerated product as soon as the blend is made or within a matter of hours thereafter; preferably this is within 48 hours. Blends of these two types of products form very readily and relatively little abrasion is observed, particularly if blending is completed in less than 2 minutes and broadly less than 10 minutes, depending upon size of the blend charges. It is believed that the electrostatic forces present and the jagged surface of the agglomerate particles per se accounts to some extent for stability of the blends made from the freeze dried granule and the agglomerate. Blend stability is important to precision in metering components of blends by such means as a screw conveyor or otherwise where feed rate errors can result in changes in consistency of the blends.

Where the appearance of the blend is to be highly uniform, it can be improved even further by pregrinding one or both of the two components separately, that is, the freeze dried component and the agglomerate can be reground in a granulator equipped with, say, a 12 mesh screen. The freeze dried and agglomerated product can be jointly or separately reduced to a −12 mesh size by grinding in a Colton sifter granulator employing dual oscillating rotors (bar type) for impact, the discharge of the mills being fed directly into hoppers of two Wallace & Tiernan gravimetric feeders which discharge the separate components into a premixing hopper and then into a screw conveyor, the screw conveyor being located above the packing machine and discharging directly into a hopper; in this application a coffee oil plating spray nozzle may be located in the blender or at the discharge of the feeder.

In general, for large scale production of freeze dried and agglomerated spray dried particles, equipment will preferably consist of two gravimetric feeders and a continuous mixer to meter and measure dissimilar streams and then combine them in a manner that does not create too much abrasion or attrition milling of the agglomerate by the granule, e.g., a Young Blender, a mixing screw or conveyor; again, coffee oil plating prior to or during blending may be employed to improve stability of the blends as well as blend appearance stemming from absence of particle dust on the sides of the jar. On the other hand, the components may be oil sprayed after blending to like advantage.

As indicated, the blend should be packaged hermetically at an oxygen content less than 10 percent, preferably below 4 percent for high quality extracts, and most preferably below 2 percent when aromatics are present in abundance as by overt addition in steam aromas, vacuum stripped aromas from roasted and ground coffee, or grinder gas or by presence in a particularly rich quality high Milds blend. Accordingly, the blend should be packaged in weighing and packaging devices capable of purging the headspace atmosphere from the package or other container to assure such oxygen reduction. Processes to effect distillation and/or recovery of such aromas which may be so employed are U.S. Pat. Nos.:

3,132,947 to Mahlmann;
3,244,532 to Mahlmann;
3,615,655 to White, et al;
3,244,531 to Clinton, et al;
3,421,901 to Mahlmann;
3,420,674 to McCartney;
3,686,687 to Lemonnier;
2,875,063 to Feldman, et al;
3,021,218 to Clinton.

OPERATIVE EXAMPLE I

Coffee Color Measurement, Density and Toughness Determination

Color

The light and dark roasting practiced in accordance with the invention can best be expressed by a color number which is a measure of the percent light reflected from a roasted and ground coffee referenced to a color standard. The higher the number, the higher will be the percent light reflected and the lighter the roast color. In general, the coffee will be roasted and quenched to a color consistent with an empirically derived terminal roast temperature, the latter being a function of roast equipment and operating conditions thereof. Generally, the coffee will be separately roasted atmospherically in a solid, cylindrical roaster and quenched by conventional techniques such as cool air, water sprays, or a combination thereof.

The color of coffee is determined by fine grinding air-cooled roasted coffee and screening it through a U.S. 50 sieve using a Rotap Testing Sieve Shaker, the hammer thereof operating for 3 minutes. The portion that passes through U.S. 50 and is retained on the pan is collected, placed in a container of 1¾ inch diameter and ⅛ inch deep and pressed under 1,500 psi by a 1⅝ inch ram for 5 seconds. The pressed coffee is placed beneath a photoelectric search unit of a color measuring device.

The color measuring device is a photoelectric reflection meter model 610 having a model Y search unit, manufactured by the Photovolt Company. The device transmits light from an incandescent bulb through an amber tristimulus filter (595 nm maximum transmittance) onto the surface of the pressed sample. The reflected light is detected by the device's sensing photocell. A standard unglazed brown ceramic tile is employed as a typical color reference. This title exhibits the following reflectance characteristics when measured on a calibrated Hunter color difference meter; cf Journal of the Optical Society of America, Vol. 48, No. 12, pp 985–995, December 1958.

|  | 90° Value** |
|---|---|
| L = 32.5 | 32.4 |
| a = 10.0 | 9.9 |
| b = 11.5 | 11.5 |

** Tile rotated 90° on a vertical axis to compensate for any tile non-conformity.

In use, this tile has been arbitrarily assigned a value of 86.5 on the Photovolt meter scale to facilitate measuring smaller color differences in coffee samples. Color numbers specified are those within the 0–86.5 range. Thus, a color reading of 40 would signify the number unit comparison of reflected filtered light relative to the aforesaid brown color standard.

The color measuring procedure for use in testing the color of soluble coffee powders either as the agglomerated spray dried or freeze dried form is different from that specified hereinabove for the degree of roast for coffee. Essentially this difference involves selection of a different light source for reflection from the reference tile and employment of a different factor of scale readings. The soluble coffee is sampled by pouring it into a relatively shallow cylindrical sampling dish; product is poured into this holder until it overflows and then the excess is removed from the rim by a spatula, care being exercised to avoid compression of the specimen. This sample is then exposed to a photoelectric reflection meter of the same type as is specified for roasted and ground coffee. The search head device is equipped to transmit light from an incandescent bulb through a green tristimulus filter (545 nm maximum reflectance) onto the surface of the test sample. The reflected light is detected as before.

In use this tile has been arbitrarily assigned a value of 75 on the Photovolt meter scale. The color measurements as before will be a percent reflectance related to this numerical range. However, in this instance, the color measurement in the stated range will be divided by factor of two to give the color determination referenced in this specification. Thus, it will be understood that colors as referred to for freeze dried agglomerated and spray dried particles will be as expressed by the aforestated color numbering procedure for soluble coffee as contrasted with the first described procedure for roasted and ground coffee.

The term density used throughout this specification refers to a free flow density determined in the following manner. A 65mm diameter and 63mm high stainless steel cup is positioned coaxially beneath a stainless steel funnel 3 3/16 inch in diameter at its mouth, ⅝ inch at its frusto-apex which is 3 inches beneath the mouth, the apex communicating with a cylindrical sleeve ⅝ inch long. Sample powders which are free of lumps are poured into the funnel and allowed to flow freely into the cup until it is overflowing, whereafter the free edge of the cup is leveled with one stroke of a spatula edge held in a vertical position. The cup is weighed and its tare weight is divided by volume to give density in grams per cc.

TOUGHNESS TEST PROCEDURE

A representative batch is subjected to a screen analysis of the +8, +12, +20, +40, −40 mesh fractions. A 30 pound charge recovered from the agglomeration operation is thereafter fed without combination with any other component such as the granule to a 3 cu. ft. Patterson-Kelly twin-shell V-blender* of the type specified herein operating at 20 rpm over a 2 minute time interval producing a discharge having a certain fines percentage. A second screen analysis of the discharge is run. The increase in the pan fraction (−40 mesh) generated by passage through the blender expressed as a weight percent of the total charge will be the measure of the particle toughness required for practice in accordance with the present invention. The tougher the agglomerate, the smaller the number in view of the fact that fewer fines will be generated in the tougher agglomerate. A weight percent increase of less than 200 percent, i.e., 20 percent of the discharge is acceptable, but less than 10 percent of the discharge is preferable.

\* Standard Tumbling Laboratory Model

OPERATIVE EXAMPLE II

Blend of Freeze Dried Quality Coffee Extract with Fused Agglomerates of a Lower Quality Extract 555 pounds of high quality arabica blend of 50 parts Colombians, 45 parts Brazils, 5 parts Robustas, were roasted in a thermolo roaster to an end temperature of 425°–435°F. The blend was roasted to a color of 45. The roasted blend was then ground and percolated using a 345°F feed water percolation temperature in a multicolumn percolator train and a percolate at 26 percent concentration was recovered therefrom. The extract was then freeze concentrated to a 35 percent solids content and the concentrate was frozen in a slab form on a freezing belt at a ½ inch thickness over a period of 15–20 minutes; as thus frozen, the coffee produced a relatively dark color when ultimately freeze dried; the slab consisted essentially of a eutectoid mass and a distribution of water ice crystals, many of which are frozen in a dendritic ice pattern. The voids left after sublimation of the ice have both communicating and non-communicating voids or vescicles therein.

The slab was then ground to a granular form, loaded into a bulk car of the type shown in U.S. Pat. No. 3,365,806 to Pfluger, et al, and the granular material was charged to a freeze dryer wherein the charge was subjected to a reduced absolute pressure below 550 microns and the moisture content was reduced to a target below 2.5 percent in 8.5 hours. The dried particles had a relatively dark color of 28 determined as specified in Example I.

Absolute pressures in the terminal half of the freeze drying below 200 microns were observed; an internal condenser temperature of −40°F being used throughout. Product temperature did not exceed 120°F during drying. Terminal moisture was 1.8 percent indicative of a retention of desired flavor values after sublimation, care being exercised against reducing moisture content below 1 percent. The free flow density was about 0.30 grams per cc.

The following is the procedure that was used to make a fusion agglomerated extract. 555 pounds of a lower quality blend of green coffee consisting of 65 percent Robusta, 25 percent Santos and 10 percent Milds were roasted to a color of 47 using the same roasting apparatus for the quality extract. The blend was roasted to 415°–425°F, ground and then percolated to a green yield of 38 percent; high yield extraction will be generally signified by a potassium content in the extract below 4.0 percent as measured by spectrophotometric means. The percolate was spray dried to spherical particles in a conventional spray dryer to an average moisture content of 2.9 percent. The spray dried spheres were then milled to the coarse grind specified, i.e., 50 percent above 15 microns, and agglomerated. The apparatus employed was that described in U.S. Pat. No. 3,554,760 issued Jan. 12, 1971 to Sienkiewicz, et al.

Referring to FIG. I of that patent, the pulverized spray dried powder was fed under the control of an air vibrator to a box adapted to vibrate vertically as shown in FIG. IV. The box was equipped with a plurality of ⅛ inch slits, cf reference numeral 9. These slits create a number of curtains of product which fall into the path of intersecting jets from steam nozzles shown in FIG. IV. These nozzles are essentially a plurality of so-called fishtail nozzles so arranged as to define two intersecting planes disposed at an acute angle of approximately 7°.

Two jet assemblies were mounted at diametric opposites in agglomerating chamber which was 12 feet in diameter and 40 feet high as shown in FIG. I measured from the height of the chamber to the apex of the conical bottom at 34. Steam was introduced to the jet assemblies at line pressure of 7–12 psig and at this pressure created sufficient velocity in the upper adjoining steam nozzles to wet and redirect the plurality of curtain planes defined by the pulverized spray dried powder in each plane. Care was exercised to limit line pressure below that point whereat individual particles would be displaced against the walls of the agglomerating chamber (i.e., 31) while at the same time avoiding such dispersion and turbulence in the zone of agglomeration as would interfere with proper agglomeration. The second underlying assembly of fishtail steam jets functioned to further wet larger size agglomerates that are not fully wetted and in so doing redirected the agglomerates into the agglomerating chamber. Underlying the foregoing description of the steam jet function is the understanding that pulverized spray dried particles are caused to be both wetted and elevated in temperature to a point whereat the surfaces thereof melt and thus, in collision at the particle contact points, undergo a fusion whereafter descending agglomerates collected as in the cooling tunnel 40 will be permanently set by the temperature reduction. The apparatus was operated at an inlet air temperature of 450°F and an outlet temperature of 200°F wet bulb and 245°F dry bulb, outlet temperature being measured at the tower bottom in the area of discharge duct 34, the thermometer well being located in the conical zone defined by wall 33; hot air circulation was so regulated as to assure maintenance of the stated inlet and outlet air temperatures. The steam-to-powder ratio was approximately 1:1. As contrasted with what is shown in FIG. I, for chill grinding the spray dried powder was ground under ambient conditions at a temperature just below 70°F in an Alpine pin mill wherein the spray dried particles were reduced to a substantially sub-100 micron size, and of a majority whose particles exceeded 15 microns, clearance between the pins of the mill being such as to assure requisite particle size pulverization. The spray dried powder at a moisture content of approximately 2.9 percent typically was fed continuously through the pin mill and collected into drums which were stored under refrigerated conditions, the collected particles being fed to the steam agglomerating area at a temperature between 56°–80°F. The product collected had a free flow density in the range of 0.24 to 0.28 grams per cc for the -8 mesh particles. The particles were packed in drums and shipped for testing.

Screen analysis of three scooped samples of each of the freeze dried granules and spray dried agglomerate samples were taken as follows:

FREEZE DRIED COMPONENT

|  | Sample 1:<br>Actual Weight<br>gms | .299 gms/cc<br>Weight % | Sample 2:<br>Actual Weight<br>gms | .303 gms/cc<br>Weight % | Sample 3:<br>Actual Weight<br>gms | .298 gms/cc<br>Weight % |
|---|---|---|---|---|---|---|
| On 8 mesh | 13.5 | 22.4 | 12.0 | 19.4 | 13.0 | 21.3 |
| On 12 mesh | 17.0 | 28.2 | 15.2 | 24.9 | 14.5 | 23.7 |
| On 20 mesh | 17.0 | 28.2 | 18.0 | 29.2 | 17.1 | 28.0 |
| On 40 mesh | 6.8 | 11.3 | 8.5 | 13.3 | 8.0 | 13.1 |
| pan | 6.0 | 9.9 | 8.2 | 13.2 | 8.5 | 13.9 |
| Total | 60.3 | 100.0 | 61.9 | 100.0 | 61.1 | 100.0 |

STEAM FUSED AGGLOMERATE

|  | Sample 4:<br>Actual Weight<br>gms | .306 gms/cc<br>Weight % | Sample 5:<br>Actual Weight<br>gms | .353 gms/cc*<br>Weight % | Sample 6:<br>Actual Weight<br>gms | .370 gms/cc*<br>Weight |
|---|---|---|---|---|---|---|
| On 8 mesh | 0 | 0 | 0 | 0 | 0 | 0 |
| On 12 mesh | 2.2 | 3.7 | 0.5 | 0.7 | 0.1 | 0.1 |
| On 20 mesh | 33.1 | 55.6 | 17.6 | 25.9 | 14.0 | 19.9 |
| On 40 mesh | 20.0 | 33.6 | 32.0 | 47.1 | 31.5 | 44.7 |
| pan | 4.2 | 7.1 | 17.9 | 26.3 | 24.8 | 35.3 |
| Total | 59.5 | 100.0 | 68.0 | 100.0 | 70.4 | 100.0 |

* A thief inserted into a collecting drum was used to collect samples 1–6. Samples 5 and 6 had high free flow densities signifying fines separation at the drum center and bottom where the thief samples were collected. When the agglomerate charge was blended with the granule charge, however, the blend density was uniform and relatively low in fines and evidence of segregation.

Twenty pounds of freeze dried granules and 40 pounds of agglomerates were fed into a Patterson-Kelly V-blender wherein the mix was blended for 4 minutes at 8 rpm rotation of the blending shaft.

The foregoing six samples represented 2-ounce specimens each of blends taken at even time intervals by interrupting the blending. the particle size distribution was substantially constant, indicating a stable blend in terms of structural integrity of components and resistance to change with blending as a uniform heterogeneous mixture is sought. The foregoing blend will be seen to have produced a distribution of particles as packaged which survived sustained mixing to effect heterogeneous distribution of the particles. The pan fraction over the time intervals was relatively consistent and comparatively low, although it may be expected that the fines in samples 4–6 as averaged would have been higher than those denominated under the pan fraction of the blend. The blending and mixing chracteristics of the two components demonstrated the ability of the agglomerate to resist the tendency towards breakdown as it is abraded with the coarse granular freeze dried material. The blend was vacuum packed and withstood significant particle degradation and density change as a consequence. The blend of relatively lower quality agglomerates with higher quality freeze dried arabicas when cup tested produces a flavor acceptability quite comparable to that of a like brew prepared from the freeze dried component per se, and thus the flavor notes of the high Robusta fusion agglomerated extract are not only less noticeable than if roasted to their optimal flavor, but also do not detract from the flavor impact of the quality freeze dried components.

OPERATIVE EXAMPLE III

Coffee Extract Granules Foamed to Low Density and Combined with Agglomerated Spray Dried Powder

|  | A | | B | | C | | D | | E | | F | |
|---|---|---|---|---|---|---|---|---|---|---|---|---|
| Screen<br>Analysis | Actual<br>Weight<br>gms | Weight<br>% | Actual<br>Weight<br>gms | Weight<br>% | Actual<br>Weight<br>gms | Weight<br>% | Actual<br>Weight<br>gms | Weight<br>% | Actual<br>Weight<br>gms | Weight<br>% | Actual<br>Weight<br>gms | Weight<br>% |
| On 8 mesh | 2.8 | 4.3 | 5.1 | 7.5 | 5.6 | 8.5 | 5.0 | 6.7 | 4.0 | 6.1 | 7.5 | 12.9 |
| On 12 mesh | 5.3 | 8.1 | 7.0 | 10.4 | 7.1 | 10.8 | 7.5 | 10.1 | 7.0 | 10.8 | 9.0 | 15.5 |
| On 20 mesh | 24.0 | 39.9 | 25.0 | 37.0 | 25.0 | 38.0 | 33.0 | 44.3 | 25.0 | 38.5 | 21.5 | 37.1 |
| On 40 mesh | 23.0 | 35.3 | 21.5 | 31.8 | 20.1 | 30.5 | 20.5 | 27.5 | 21.5 | 33.1 | 14.5 | 25.0 |
| pan | 10.0 | 15.4 | 9.0 | 13.3 | 8.0 | 12.2 | 8.5 | 11.4 | 7.5 | 11.5 | 5.5 | 9.5 |
| Total | 65.1 | 100.0 | 67.0 | 100.0 | 65.8 | 100.0 | 74.5 | 100.0 | 68.0 | 100.0 | 58.0 | 100.0 |

Employing the 35 percent freeze concentrated extract described in the foregoing Operative Example II a slush formed lower density freeze dried granule was prepared specifically for blending purposes with an agglomerate. Extract was charged to a Vogt swept surface heat exchange 10 feet long by 6 inches in diameter, equipped to circulate a refrigerant circumjacent to the heat exchange surface and maintaining the refrigerant at a temperature −20°F employing a 60 percent methanol/40 percent water refrigerant mixture. The extract was fed to the heat exchanger at a temperature of about 55°F. The exit temperature of the slushed extract recovered from the heat exchanger was 24.5°F. Pressurized air was sparged into the heat exchanger to expand extract volume by approximately 50 percent. Extract was caused to flow through the heat exchanger in combination with the air at a rate of 700 cc's per minute, extract flow being effected by regulating pump speed delivering extract to the heat exchanger and control being regulated by rotameter and manual adjustments to achieve the stated flow rate. Likewise, airflow to the extract was measured by a rotameter suitably controlled by a valve and thus providing a controlled input of foaming sparging gas, the air being charged to the heat exchanger in the form of small gas bubbles by means of a sparging nozzle located within the exchanger tube, foaming being controllably affected by redistribution of the gas by shaft agitation within the heat exchanger.

By the foregoing slush foaming procedure extract which when freeze dried would normally have a density in the neighborhood of 0.30 grams per cc was foamed to a condition whereat it would have a density in the neighborhood of 0.20 grams per cc, the extract being placed on trays for freezing, whence the extract was freeze dried and ground.

As an alternative to the procedure specified hereinabove a scraped surface heat exchanger (Votator) was likewise employed. In this instance, two Votators were used in series, the first being operative to effect refrigeration slushing and the second being employed to effect expansion of the slushed extract. The the first Votator is essentially used as a heat exchanger to effect partial crystallization of the water ice in the extract, and the second Votator is employed for effectively intermixing air with the extract. Extract at the concentration aforesaid and produced in accordance with the procedure of Example II was slushed in the first Votator, recovered at a temperature approximately 24°F, fed to a second Votator and expanded as before by introduction of gas to increase the volume thereof 50 percent. In this way the product was foamed to a density of approximately 0.187 grams per cc.

The freeze dried product from the Votator's system had an average product color in the neighborhood of 43.5 after freeze drying. The Vogt slush foam, when frozen, freeze dried and ground, on the other hand, had a darker averate product color of 36.5 This difference stems from the different freezing rates and ice crystals generated in the heat exchange systems; in the Vogt system there is a longer residence time and a greater opportunity for growth of larger water ice crystals; the freeze dried product was correspondingly darker. In the Votator, which generates discrete water ice crystals in the expanded slushed foam, there was produced a lighter color in the final product. These two color changes can alter the color of the freeze dried component of blends with the fused agglomerate produced in accordance with the procedure of Example II.

A 100 gram sample of the Votator expanded freeze dried granules and 200 grams of the steam fused agglomerates described in Operative Example II were subjected to a series of blending experiments. First, each of the samples were separately screened through a No. 12 screen and then blended as before in a V-blender over a period of 3 minutes. The density of the blend was 0.239 grams per cc. The heterogeneous distribution of expanded granules and steam fused agglomerates exhibited a color of 33.0. In a second experiment, the expanded granules were passed through a 12 mesh and the particles collected on an 80 mesh were retained. The same procedure was used to collect 200 grams of steam fused agglomerates. 100 grams of the granules and 200 grams of the agglomerates as before were blended for 3 minutes in a V-blender. The blend had a density of 0.250 grams per cc and a color of 34.0. In a third experiment an unscreened specimen of 100 grams expanded granules and 200 grams steam fused agglomerates were blended as before in a V-blender for 3 minutes. The unscreend blend had a density of 0.230 grams per cc and a color of 35.0. The three blends did not experience separation. The steam fused agglomerate could be effectively blended with an expanded granule and thereafter packed hermetically in a reduced oxygen, i.e., below 2 percent oxygen, in an inert gas headspace. The appearance of the blend was judged an improvement over an expanded freeze dried granule per se. Blended in the ratio of 1:2 the blend density, i.e., 0.230, was predictably intermediate the two blends in proportions of densities indicating a consistency in blending. The fusion agglomerate had a color below 29 prior to blending and the blending operation resulted in a product having a color ranging between 33-35, the color representing the blend of the lighter color expanded freeze dried granule described hereinabove and the agglomerate. The blend was judged to be stable and practical. The blend when cup tested produces a quality flavor impact highly reminiscent of the flavor of freeze dried foamed extract per se.

OPERATIVE EXAMPLE IV

Split Drawoff — Freeze Drying Initial Drawoff And Fusion Agglomerating Secondary Drawoff A blend of 16.8 Colombian Milds, 16.8 Colombian Manizlas, 16.8 Colombian Coatepecs, 44.6 Brazilian Santos and 5.0 Ivory Robustas was roasted to a color of 40. The ground blend was charged to a six-column percolator train of conventional design. The cycle time in each column was 30 minutes. Fresh water was introduced to the most spent column at a temperature of 345°F. Extract entering the fresh column was cooled to about 220°F and was recovered from the column at about 190°F. The extract thus produced would normally be recovered at an extract concentration of 26 percent and would represent solids collected at a dry green yield of 36.5 percent (corresponding to a 42 percent roasted yield - dry basis). However, in this example, the first anticipated two thirds. The first third had an extract drawoff concentration of 35.2 percent. The first third of the extract wss characterized as aromatic, quality extract, and the second two thirds of 23 percent solids concentration is a less aromatic, somewhat sour and acidy character extract. The split drawoffs were then separately feed to a freeze drying and spray drying operation, respectively. The quality extract was freeze dried to about 1.5 percent moisture and the lesser quality extract to about 2.0 percent using conventional spray drying procedures. The extract was belt frozen over a period of 25 minutes at a thickness of approximately ½ inch to produce a slab which was ground and charged to a shelf car of the type set forth in the Pfluger patent specified herein. The extract was freeze dried using a profile wherein the product temperature did not exceed 120°F at any time. Absolute pressures within the freeze dryer were below 500 microns for the entire drying cycle, the internal condenser temperature being −40°F (referring to the refrigerant temperature for cooling the condenser) with an intended −60°F condenser temperature being employed in the last 2 hours of an 8 ½ hour drying cycle. The color of the granular product was about 28 and had a free flow density of 0.29 grams per cc. The lower quality extract was spray dried conventionally and had a free flow density of 0.19 grams per cc and a color of about 25. Extract was spray dried using an inlet air temperature of 500°F and an outlet air temperature of 240°F, extract fed to the drying tower being about 95°F. The spray dried extract was fusion agglomerated using the procedures described in Operative Example II with the following differences. The powder was dried using an air outlet temperature of 225 F (dry bulb) and an inlet temperature of 465°F (dry bulb). The fused agglomerates had a free flow density of 0.230 grams per cc and a color of about 28. One part of granule was blended with two parts by weight of agglomerate, mixed to a uniform heterogeneous distribution and plated with coffeee oil to a 0.4 percent level. The blend was then packaged in 2-ounce glass jars under a nitrogen purge with residual jar oxygen less than 1 percent. The agglomerate had a 4.2 percent moisture as recovered and packaged and when blended with the freeze dried granule which was at about 2 percent moisture, equilibrated in jar to an average moisture of 3.5 percent. The product produced was relatively stable against segregation and is significantly preferred over a spray dried control derived from the extract without splitting the drawoff.

OPERATIVE EXAMPLE V

Blend of a Freeze Dried Granule and an Agglomerate

A 100 percent Colombian coffee was roasted in a thermolo roaster to a roast color of 40, ground and charged to a six-column countercurrent extraction train to produce an extract having a highly aromatic and strong taste. The percolate was percolated to a 25 percent solids concentration having a roasted yield of 39.5 which corresponds to a green yield of 30.8. The extract was then freeze concentrated to 27 percent solids, the extract recovered and then frozen in 10 minutes on a belt refrigerated at −40°F to produce a slab about ¼ inch thick. The slab was then ground and freeze dried in the Pfluger, et al, freeze dryer cited herein, producing a granule having a free flow density of 0.220 grams per cc, a color of 42 and a moisture content of 1.5 percent.

Separately, a 100 percent Robusta blend was similarly roasted to a roast color of 72, ground, charged to a six-column counter-current extraction train and percolated under high yield (less than 4 percent potassium in the percolate) extraction conditions to produce a relatively bland, highly extracted percolate recovered at a solids concentration of 25percent with a green yield of about 40 percent. The extract was spray dried into spherical particles collected at a final product powder moisture of 1.65 percent, the powder passing a No. 16 U.S. Standard mesh screen. The powder was then transported to a grinder equipped to cool the powder with liquid $CO_2$ to about 40°F. Cool powder was ground to a fineness which was predominantly shattered spherical spheres capable of passing a 100 mesh sieve and having a majority by weight of its particles greater than 15 microns. A Fitzpatrick hammermill having a round ⅛ inch opening was used to produce desired particle size distribution. The cold ground powder was then steam agglomerated essentially as described in Operative Example II was desuperheated stem to finely ground particle ratio of 1:1. The agglomerate falling by gravity to the bottom of the agglomerator passed through a cooling tunnel wherein it was chilled to 80°F. After leaving the cooling tunnel the agglomerate was screened to remove the +8 mesh coarse fraction and the −30 mesh fine fraction. The material thus removed was recycled for passage through the grinder as before together with approximately 5 percent of mid-sized agglomerate to maximize toughness. Thus, sufficient product from between the screens was also recycled to the grinder to obtain a total recycle rate of 30 percent of the agglomerator feed. The agglomerate density was 0.21 grams per cc and had a color of 19.5, and a moisture content as collected of 4.2%.

The screen analysis for the granules and the agglomerates was as follows:

| U.S. Standard Sieve | % by wt Granules | % by wt Agglomerates | % by wt Blend |
|---|---|---|---|
| On 8 | .5 | 18 | 7.3 |
| 12 | 12.0 | 17 | 20.0 |
| 20 | 58.0 | 31 | 40.7 |
| 40 | 22.0 | 19 | 17.7 |
| Through 40 | 7.5 | 15 | 14.1 |

Figure 2:
Figure 3:

35 parts by weight of granules were combined with 65 parts by weight agglomerates by blending in a V-blender (Chemical Engineering Catalog, Reinhold Publication, 1972 Ed., p. 20, showing a twin shell blender) for 2 minutes until a uniform heterogeneous distribution of granules and agglomerates is produced. The blend is a distinctive speckled product suggestive to many of roasted and ground coffee, quite free flowing and had a 3.5 percent moisture. The blend density was 0.235 grams per cc. The blend was then spray plated with 0.4 percent expressed coffee oil and packaged in jars at an oxygen content below 2 percent using a nitrogen purge to sweep the jar. The product was packaged essentially had the appearance shown in accompanying drawing showing photographs and photomicrographs (at 20 and 35 diameter) of the blend; cf Figures 1–3 attached.

When illuminated by incandescent light, the granules exhibit a creamy, light golden, light tan color, appear shiny, cavernous, crystalline and are highly light reflective. On the other hand, the agglomerates under such illumination are darker brown and appear to be glued together by particles into a craggy, irregulator shape having the appearance of garnet or gemstone with dark brown vitreous spots located around the particle; the agglomerate is characterized by a plurality of bubble-like voids. In a blend the particles merge into a novel contrasting appearance like that shown in FIG. 2.

Applicants have endeavored, through a series of operative examples and an extended specification, to describe the varying possible alternative embodiments of the present invention. It will be apparent to those skilled in the art that other alternatives may be practiced to like advantage. Thus, lower quality spray dried extract of foreign origin, say an extract from essentially spray dried Brazilian Santos beans, can be blended with the spray dried spheres extracted to a high yield as in the case of a split drawoff or as in the case of a lightly roasted, highly extracted primarily Robusta blend like that in Operative Example IV, the blend being then ground as before and steam fusion agglomerated.

We claim:
1. Process for producing an hermetically packaged, granular-appearing blended soluble coffee product consisting essentially of at least two differently-appearing and flavored soluble coffee dried extracts which comprises converting at least one of said extracts into a dried granular, flavorful, quality constituent by freezing and subliming the extract moisture from a quality extract and converting it into granular form, converting a second extract to a product relatively bland and flavorfully different from the first extract by spray drying in into spheres and initially pulvervizing the spheres to a particle size distribution wherein a major weight is between 15–200 microns and then agglomerating the particles into point-to-point fused aggregated matrices having void spaces therein under conditions wherein the particles are fused at said contact points by melted extract to one another, have a moixture level between 3.5–5.0 percent, and have a coarse, non-uniform, uneven surface, said first extract having been reduced to a first light density and a moisture level between 1–3 percent, the dry density of the first extract being within 25 percent of the second extract, and both extracts having dry densities between 0.18–0.35 grams per cc, proportioning the two dry extracts and blending them to a uniform distribution of grossly discernible, dissimiarly-appearing particles and whose relative weight percent results in a total packaged product moisture after water vapor transfer from agglomerate to granule of less than 4.5 percent, the level of said dry granular quality constituent being 5–60 percent of the total blend, and packaging said blended product in an atmosphere of reduced oxygen and moisture.

2. The process of claim 1 wherein the first extract is recovered from a blend different from that of the second extract.

3. The process of claim 2 wherein the first blend has a higher level of quality arabicas than the second blend.

4. The process of claim 2 wherein the second blend has a higher level of Robustas than the first blend.

5. The process of claim 1 wherein the first extract is a quality portion of a percolate and the second extract is a lower quality portion of the same percolate.

6. The process of claim 5 wherein the first extract contains drawoff from a fresh unextracted bed of roasted and ground coffee which has been contacted with aqueous extract and wherein the second extract contains drawoff from an extracted bed of roasted and ground coffee which has already been percolated in at least one extraction cycle, the first extract being principally composed of said first drawoff and the second extract being principally composed of said second drawoff.

7. The process of claim 6 wherein the first extract is a drawoff percolated from the same bed of coffee as the second extract.

8. The process of claim 1 wherein the caffeine level of the second extract has been reduced by decaffeination.

9. The process of claim 1 wherein the first extract is recovered from a first blend having at least 30 percent arabica that has been roasted to a color less than 50.

10. The product of the process of claim 1.

11. The process for packaging a granular appearing blend of soluble coffee products each of which are flavorfully different and different in appearance which comprises preparing a quality blend having 30 percent or more quality arabica coffeee therein and roasting said blend in a first zone, preparing a second blend containing 30 percent or more Robusta coffee, roasting the second blend in a second zone separate from the first zone, correlating the relative roast conditions such that the second blend has a ligher roast color whereby characteristic earthy, tarry Robusta notes ate suppressed, separately percolating the first roast and the second roast and separately recovering 25 first and second extracts the extracts of said first and second blends, said second blend being percolated to a green yield of a least 35 percent solids whereby a relatively bland extract is derived freezing and subliming the extract moisture in the first extract and converting the extract to a dry coarse granular freeze dried flavorful quality extract product having a moisture level between 1–3 percent, spray drying the second extract to spheres, pulverizing at least a portion of the spray dried spheres to a particle charge having a particle majority by weight above 25 microns and then agglomerating the charge into aggregated granular matrices wherein the subdivided particles per se are in point-to-point fused relationship and the matrices have void spaces therein and jagged, irregular surfaces by causing said particles to be contacted by steam jets in a hot, humid atmosphere and be wetted thereby at the surface thereof and elevated in temperature to a point where said surfaces are melted at their contact points and achieve said fusion thereat, said matrices being perfected by the particles of the charge being caused to contact one another while in said hot, humid zone, the agglomerates being collected at a moisutre level between 3.5–5.0 percent and having a density approximating that of the first extract granules, blending the two dry extracts into a uniform distribution of grossly discernible, dissimilarly appearing particles whose respective densities for each particle size approximate one another, the blend containing 5–60 percent of said freeze dried quality extract and packaging the blended product in an atmosphere of reduced oxygen and moisture under hermetic packaging conditions.

12. The process of claim 11 wherein the second extract is percolated from a Robusta-containing blend having a roast color number greater than 60.

13. The process of claim 12 wherein the extract of the first blend has been frozen and freeze dried at a condenser temperature less than −40°F for a period of the drying cycle.

14. The process of claim 13 wherein the first extract is granulated prior to freeze drying.

15. The process of claim 14 wherein the coffee of the first blend is roasted to a color number less than 50.

16. The process of claim 11 wherein the first extract granular product and the second agglomerated product each have densities between 0.18 and 0.35 grams per cc.

17. The process of claim 16 wherein the first extract is slowly frozen in order to provide a dark color in the granular components.

18. The process of claim 11 wherein the first extract granular product and the second agglomerated product have a density between 0.20 and 0.30 grams per cc and the first product has a density within 15 percent of the second product.

19. The process of claim 18 wherein the first extract percolate is relatively dilute, has a solids content less than 30% and is of such concentration that the granular product produced therefrom has a density within 10 percent of the second agglomerated product density.

20. The process of claim 18 wherein the first extract percolate has a concentration greater than 20 percent, is concentrated to greater than 30 percent solids and is foamed to a density whereat the granular product produced therefrom has a density within 10 percent of the second agglomerated product density.

21. The process of claim 20 wherein the foamed extract has been dried after seed crystals have been added to the extract prior to freezing thereof.

22. The process of claim 1 wherein the spray dried second extract is pulverized to an extent that 30–100 percent by weight is finer than 150 microns.

23. The process of claim 22 wherein the second blend is composed of Robusta coffee in major weight percent and which has been roasted to a color number greater than 65.

24. The process of claim 22 wherein the agglomerate comprises principally particles which have been ground to below 100 microns.

25. The process of claim 24 wherein the pulverized particles are cooled to below 80°F preparatory to fusion thereof in said agglomerating zone.

26. The process of claim 25 wherein the spray dried spheres are cooled to below 60°F prior to pulverization thereof.

27. The process of claim 1 wherein the spray dried particles are pulverized to a point where a majority by weight thereof have a size below 150 microns and wherein the spray dried spheres have been cooled to below 80°F. prior to pulverization.

28. The process of claim 1 wherein the pulverized particle charge is wetted to 4.0–4.5 percent as a result of being agglomerated with saturated steam jets in said fusion zone.

29. The process of claim 1 wherein steam jets are caused to contact said pulverized spray dried particle charge arrayed in a discretely separate form and redirect and collide them in the confined, hot, humid agglomerating zone.

30. The process of claim 1 wherein a majority of the particle sizes of the first and second products approximate one another in the −12 mesh +40 mesh range.

* * * * *

UNITED STATES PATENT OFFICE
CERTIFICATE OF CORRECTION

Patent No. 3,821,430　　　　Dated　June 28, 1974

Inventor(s)　Robert C. Reeves et al.

It is certified that error appears in the above-identified patent and that said Letters Patent are hereby corrected as shown below:

On the cover page, after "Attorney, Agent, or Firm," change "Bruno P. Sturzzi" to -- Bruno P. Struzzi --.

In column 11, line 13, change "3,686,687" to -- 2,686,687 --.

In column 12, before line 39, "The term density used throughout this specification", insert the heading -- Density --.

In column 13, line 14, delete "555" and insert -- 550 --; line 50, delete "555" and insert -- 550 --.

In column 16, line 46, change "formed" to -- foamed --.

In column 17, line 18, change "The" to -- Thus --; line 34, change "averate" to -- average --.

In column 18, line 14, change "color" to -- colored --; line 38, after "anticipated" insert -- third of the drawoff was collected separately from the second --; line 40, change "wss" to -- was --; line 44, change "feed" to -- fed --.

In column 19, line 59, change "was" to -- with --; same line, change "stem" to -- steam --.

In column 20, line 30, change "was" to -- as --; line 33, change "diameter" to -- diameters --.

In column 21, line 18, change "dissimiarly" to -- dissimilarly --.

In column 22, line 2, delete "25" and insert -- as --; line 4, change "a", (second occurrence), to -- at --; line 6, after "derived" insert a comma.

Signed and sealed this 19th day of November 1974.

(SEAL)
Attest:

McCOY M. GIBSON JR.
Attesting Officer

C. MARSHALL DANN
Commissioner of Patents